United States Patent [19]

Tenney et al.

[11] Patent Number: 5,376,350
[45] Date of Patent: Dec. 27, 1994

[54] PLUG FLOW PROCESS FOR THE PRODUCTION OF CHLORINE DIOXIDE

[75] Inventors: Joel D. Tenney, Atlanta; John R. Winters, Marietta, both of Ga.

[73] Assignee: Eka Nobel AB, Bohus, Sweden

[21] Appl. No.: 988,676

[22] Filed: Dec. 10, 1992

[51] Int. Cl.$^5$ .................................... C01B 11/02
[52] U.S. Cl. .......................... 423/478; 423/479
[58] Field of Search .................. 423/477, 478, 479; 204/95

[56] References Cited

U.S. PATENT DOCUMENTS

| | | | |
|---|---|---|---|
| 3,563,702 | 2/1971 | de Vere Partridge et al. | |
| 4,081,520 | 3/1978 | Swindells et al. | |
| 4,250,144 | 2/1981 | Ratigan | 423/477 |
| 4,578,261 | 3/1986 | Lobley | 423/478 |
| 5,061,471 | 10/1991 | Sundblad et al. | |
| 5,066,477 | 11/1991 | Zell et al. | 423/478 |
| 5,091,166 | 2/1992 | Engström et al. | |
| 5,091,167 | 2/1992 | Engström et al. | |
| 5,122,240 | 6/1992 | Cowley | 204/98 |

*Primary Examiner*—Benjamin R. Fuller
*Assistant Examiner*—Valerie Lund
*Attorney, Agent, or Firm*—Burns, Doane, Swecker & Mathis

[57] ABSTRACT

A plug flow process for the production of chlorine dioxide by reacting chloric acid and/or an alkali metal chlorate, optionally a mineral acid and a reducing agent in such proportions that chlorine dioxide is produced. Reactants are continuously fed to a plug flow reactor under conditions that chloride dioxide is produced as the reactants flow through the reactor. The process stream has an acidity between 2N and 11N. The process stream is subjected to superatmospheric pressure in the reactor sufficient to maintain the formed chlorine dioxide in solution. After removal of the chlorine dioxide from the process stream exiting the plug flow reactor, the process stream can optionally be fed to a second chlorine dioxide generator for further reaction.

17 Claims, 4 Drawing Sheets

PLUG FLOW PROCESS FOR THE PRODUCTION OF CHLORINE DIOXIDE

BACKGROUND OF THE INVENTION

1. Field of the Invention

The invention relates to the art of chlorine dioxide production, and in particular, to the continuous production of chlorine dioxide in a plug flow reactor by reduction of an alkali metal chlorate or chloric acid with a reducing agent. In a preferred embodiment, the process of the invention uses hydrogen peroxide as the reducing agent.

2. Description of the Prior Art

Chlorine dioxide used in aqueous solution is of considerable commercial interest, mainly in pulp bleaching, but also in water purification, fat bleaching, removal of phenols from industrial wastes, etc. It is therefore desirable to provide processes in which chlorine dioxide can be efficiently produced.

In existing processes for the production of chlorine dioxide, chlorine gas is often formed as a by-product, due to the use of chloride ions as a reducing agent. The basic chemical reaction involved in such processes is:

$$ClO_3^- + Cl^- + 2H^+ \rightarrow ClO_2 + \tfrac{1}{2}Cl_2 + H_2O \qquad [1]$$

The chlorate ions are provided by alkali metal chlorate, preferably sodium chlorate, the chloride ions by alkali metal chloride, preferably sodium chloride, or by hydrogen chloride, and the hydrogen ions are provided by mineral acids, generally sulfuric acid and/or hydrochloric acid.

In the production of chlorine dioxide with chloride ions as the reducing agent according to reaction [1], half a mole of chlorine is produced for each mole of chlorine dioxide. This chlorine gas by-product has previously been used as such in paper mills as a bleaching agent in aqueous solution. However, increased environmental demands have resulted in a change-over to pure chlorine dioxide bleaching. To achieve pure chlorine dioxide bleaching there is an increasing demand for chlorine dioxide manufacturing processes which do not produce chlorine as a by-product.

One known way of reducing the chlorine by-product is to use reducing agents which do not produce chlorine as a by-product. One example is in the so-called "Solvay" process, wherein alkali metal chlorate is reduced in an acid medium with methanol as the reducing agent. Another example is in the "Mathieson" process, in which chlorate is reduced with sulfur dioxide in a sulfuric acid-containing medium. These processes use methanol and sulfur dioxide, respectively, as indirect reducing agents, and hence the rate of reaction is very slow. In U.S. Pat. No. 4,081,520, an allegedly more effective "Solvay" process is described using a reduced pressure and a high acid normality in a single vessel reactor.

The direct reducing agent in the case of methanol and sulfuric acid reactions is chloride ion reacting according to reaction [1]. The chlorine produced then reacts with methanol to regenerate chloride ions according to the reaction:

$$CH_3OH + 3Cl_2 + H_2O \rightarrow 6Cl^- + CO_2 + 6H^+ \qquad [2]$$

or with sulfur dioxide according to the reaction:

$$Cl_2 + SO_2 + 2H_2O \rightarrow 2HCl + H_2SO_4 \qquad [3]$$

According to one prevalent theory holding that chloride ion must be present, it is often necessary to continuously add a small amount of chloride ion in order to obtain a steady production. Due to the continued presence of chloride ion, even with methanol or sulfur dioxide as the reducing agent, a certain amount of chlorine by-product is produced. According to U.S. Pat. No. 4,081,520, operating with methanol as reducing agent, the amount of chlorine by-product produced is decreased with increasing acid normality in the reaction medium. The reaction rate is also increased with increasing acid strength. At a low acid normality, the reaction is so slow that it is of no commercial interest. However, the drawback with a high acid strength in the reaction medium is, in addition to more corrosion in the equipment, the production of an acid salt in the form of sesquisulfate ($Na_3H(SO_4)_2$) or bisulfate ($NaHSO_4$). This occurs at an acid normality of from above about 5N to about 12N. An acid salt results in loss of acid in production and costs for neutralization of the salt. From about 2N to about 5N acid normality, a neutral alkali metal salt (alkali metal sulfate) is formed.

It is also known to speed up the reaction rate at low acidities by using catalysts both with chloride and methanol as the reducing agent. U.S. Pat. No. 3,563,702 discloses catalysts for chloride reduction. However, catalysts are expensive and thus increase the production costs.

Another drawback with methanol as the reducing agent is the possible formation of chlorinated organic compounds, from by-products of methanol, in the downstream bleaching process. It is well known that the efficiency of the added methanol is lowered due to side reactions wherein formaldehyde and formic acid are formed. Also, some of the methanol leaves the reactor without having participated in the reduction reaction. The corresponding ether and ester are probably there as well. It could be expected that reactions can occur in the bleaching train with aldehyde, acid, ether and ester, resulting in chlorinated organic compounds.

In U.S. Pat. Nos. 5,091,166 and 5,091,167, the drawbacks of using methanol as a reducing agent are addressed by substituting hydrogen peroxide for methanol. These patents disclose production of chlorine dioxide using a single vessel process under subatmospheric pressure. Alkali metal chlorate is reduced with hydrogen peroxide as the reducing agent in an aqueous reaction medium containing sulfuric acid. The reaction medium is maintained at its boiling point of between 50° C. and 100° C. such that water is evaporated therefrom, forming steam. A gaseous mixture containing the steam, produced chloride dioxide, and by-product oxygen is withdrawn from the vessel.

In the reaction medium an alkali metal salt crystallizes and is removed. The type of salt crystallized is a function of the acid normality of the reaction medium. At an acid normality of between 2 and 4, a neutral sodium sulfate salt, for example, $Na_2SO_4$, forms. At higher acid normalities, a sesquisulfate salt or a bisulfate is formed.

While the processes disclosed in U.S. Pat. Nos. 5,091,166 and 5,091,167 are a great improvement over the prior art methanol processes, they are performed in a single vessel process (SVP ®) reactor in which the generation and separation of chlorine dioxide are carried out in a single reaction vessel maintained at the boiling point of the reaction medium. Kinetically, the single reaction vessel functions as a constant flow stirred tank reactor ("CFSTR" or "CSTR"). There are indeed numerous advantages to this type of reaction vessel. By maintaining the reaction medium at its boiling point, the evolved chlorine dioxide is diluted with steam, thereby reducing explosion risk. Alkali metal salt concentration in the reaction medium is maintained at saturation, resulting in the alkali metal salt being continuously deposited and easily removed.

On the other hand, single vessel processes require long residence times to obtain an acceptable rate of conversion. Long residence times require either a low flow rate through the reaction vessel (and subsequent low production rate) or a large vessel size. Production requirements, at least for large consumers of chlorine dioxide, dictate that residence times be maintained via a large reaction vessel. Paper pulp mills, for example, require between 15 and 60 tons per day (TPD) of chlorine dioxide, and this production level requires large scale equipment.

A typical SVP® reaction vessel for 40 TPD of chlorine dioxide is about 10 feet in diameter and has a volume of about 8800 gallons. Since chlorine dioxide is produced on-site (for safety reasons), the SVP® reaction vessel and related process equipment must be shipped to and installed at the location of use. Shipping costs are high due to the weight and bulk involved. Also, the size of the reaction vessel requires the commitment of considerable plant space.

In addition to the costs and the space requirements of an initial installation, further costs are incurred if an upgrade in chlorine dioxide production capacity using SVP® technology is required. Such an upgrade would require removal of the existing generator vessel and replacement with an even larger vessel, essentially duplicating the initial installation costs. Alternatively, the upgrade would require the addition of a secondary SVP® generator having additional installation costs and space requirements. In either case, the upgrade would be expensive.

The concept of plug flow reactors has heretofore been applied to various chemical processes and offers the advantage of small size with reasonable production rates. However, plug flow reactors were not believed feasible for producing chlorine dioxide, due to the relatively slow kinetics of uncatalyzed reaction schemes. Catalyzed systems were also deemed unsuitable for plug flow processes due to accumulation and clogging of the equipment by the solid phase catalyst.

In very small scale processes, non-CSTR, continuous chlorine dioxide reactions have been used successfully. For example, in U.S. Pat. No. 5,061,471, there is disclosed a process for continuous production of chlorine dioxide using alkali metal chlorate, sulfuric acid and sulfur dioxide as the reducing agent. This process is suitable for small scale chlorine dioxide applications such as treatment of drinking water, etc. This patent does not teach plug flow, however, since the concentration profile in the reactor is uniform, which approximates a CSTR.

There is accordingly a need in the art for a chlorine dioxide process which has the advantages of low chlorine by-product generation and high production rate and which also has reduced installation and upgrading costs compared to processes using single vessel process generators.

SUMMARY OF THE INVENTION

It is accordingly an object of the invention to provide a process for producing chlorine dioxide having reduced installation costs.

It is another object of the invention to provide a process for producing chlorine dioxide, as above, whereby the space requirements of the chlorine dioxide plant are reduced compared to a single vessel process.

It is still another object of the invention to provide a process for producing chlorine dioxide, as above, which can be used to upgrade the capacity of an existing chlorine dioxide plant with reduced installation costs and space requirements.

It is yet another object of the invention to provide a process for producing chlorine dioxide, as above, having low chlorine by-product generation.

These objects are achieved by a process for producing chlorine dioxide, wherein alkali metal chlorate, sulfuric acid and hydrogen peroxide as a reducing agent are fed to one or more reaction conduits which function as a plug flow reactor. Chlorine dioxide is formed as the process stream flows through the reactor and is recovered from the stream after it exits the reactors. Alkali metal salt is also recovered from the exiting process stream, preferably while still in solution in the reaction medium.

The objects of the invention are also achieved by a process for producing chlorine dioxide, wherein chloric acid and hydrogen peroxide are fed to the plug flow reactor. One of the advantages of using chloric acid compared to alkali metal chlorate is that the formation of sulfate salt is eliminated. This in turn eliminates the need for a downstream salt cake filter. This process is particularly adapted for use as a "stand alone" chlorine dioxide generating plant. Optionally the chloric acid feed can contain alkali metal chlorate which is not reacted and thus comprises a "dead load" in the system. This reaction scheme allows the use of a mixed chloric acid/chlorate product produced by the partial electrolysis of alkali metal chlorate.

The objects of the invention are also achieved by a method for increasing the production capacity of an existing single vessel chlorine dioxide generator by installing a plug flow reactor upstream from, and in series with, a single vessel generator.

DESCRIPTION OF THE DRAWINGS

For a full understanding of the invention, the following detailed description should be read in conjunction with the drawings, wherein.

DETAILED DESCRIPTION OF THE PREFERRED EMBODIMENTS

The present invention provides for a plug flow process having high production rate through the use of selected reactants and hydrogen peroxide as a reducing agent. Plug flow is defined as fluid flow through a conduit in an orderly manner with no element of fluid overtaking or mixing with any other element ahead or behind. The plug flow process of the invention can be used as a stand alone chlorine dioxide generator, or in series with one or more additional plug flow reactors, or with one or more single vessel process (SVP®) generators. In one preferred embodiment, the plug flow reactor is used to upgrade the production capacity of an existing SVP® installation. In this embodiment, a plug flow reactor (pfr) is installed upstream of and in series with an existing SVP®. In a highly preferred embodiment, existing SVP® installations using prior art technologies such as methanol, $SO_2$ or $Cl^-$ based reactions, can be upgraded by conversion to hydrogen peroxide technology in conjunction with use of the plug flow reactor.

In another embodiment, pure chloric acid is reduced with hydrogen peroxide in a pfr to form chlorine dioxide. This process is particularly adapted for a small scale, stand alone plug flow generator producing chlorine dioxide for use in water treatment and related applications wherein strict environmental regulations preclude discharge of by-products and unreacted starting materials such as chlorates, methanol, methanol derivatives, sulfur-based compounds, etc.

Figure 1:
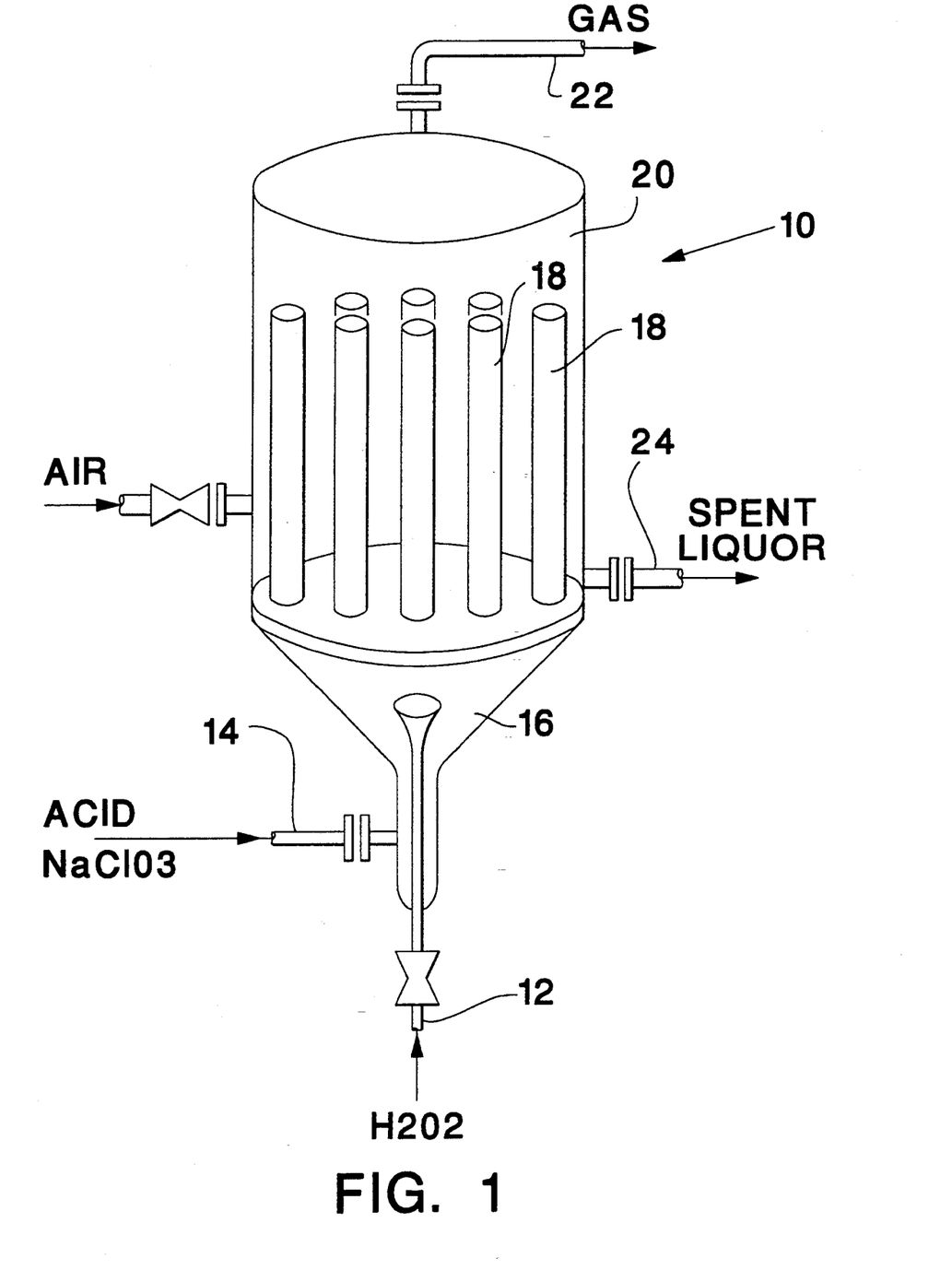
FIG. 1 illustrates one embodiment of a plug flow reactor for use in the process of the invention.

A plug flow reactor suitable for use in the invention is illustrated in FIG. 1 and is generally indicated by the number 10. Hydrogen peroxide enters the reactor 10 through conduit 12, and a mixture of sulfuric acid and either or both chloric acid and alkali metal chlorate are fed through conduit 14. Mixing of the feeds from conduits 12 and 14 occurs in the distribution header 16 of the reactor 10, forming a reaction medium. The reaction medium enters a plurality of reaction tubes 18 wherein reaction takes place in a substantially plug flow manner.

Flow through the tubes 18 is preferably in the turbulent flow region, but the level of turbulence is such that back mixing or forward mixing of the flow stream is minimized in accordance with plug flow requirements. Each tube functions as an individual pfr. The size of each tube and the flow velocity through the tubes is a function of the necessary residence time to convert a predetermined portion of the chlorate ion to chlorine dioxide. Typical tube velocities range from about 0.01 to about 1.0 ft/sec, desirably from about 0.02 to about 0.3 ft/sec and are preferably around 0.02 ft/sec. In general, the reaction tubes 18 have a length of from about 5 to about 20 ft, desirably from about 10 ft to about 16 ft, and preferably about 12 ft. The inner diameter of the reaction tube 18 is between about 0.5 in and about 6 in, desirably between about 1 in and 3 in and preferably between about 1.5 and about 2.0 in. Chlorate conversion is typically in the range of 5–70%, desirably between about 20% and 50% and preferably about 40% of the incoming chlorate feed.

After reaction, the reaction medium flows out of the reaction tubes into the shell 20 of the pfr. Gas—liquid separation occurs in the shell 20. Product chlorine dioxide gas flows out of the reactor 10 via conduit 22, and is recovered by well-known means. Spent reaction liquor flows out of the tubes 18 and collects in the bottom of the reactor shell 20. Thereafter, the liquor is pumped out of the shell via conduit 24 and into the SVP® generator (not shown).

The pfr can be operated isothermally (constant temperature), or adiabatically (no energy input or lost).

Because sulfuric acid is used in this embodiment, a heat of dilution is generated which is sufficient to operate the process adiabatically. Adiabatic operation has the advantage of simplifying the reactor design and conserving energy. Thus, the energy needed to drive the reaction in the pfr is provided exclusively by the heat of dilution for the acid feed. The pfr is operated in a non-crystallization mode, whereby the sulfate salt is not crystallized in the pfr.

The pfr can operate over a range of pressures. Typically, the total pressure in the reactor can be between about 200 and about 760 mm Hg absolute. Desirably the total pressure is from about 290 to about 310 mm Hg absolute, with about 300 mm Hg preferred. Air can be added to the pfr, if necessary, to dilute the chlorine dioxide product gas.

In a first preferred embodiment, the pfr reactor is used in series with an SVP® generator, and employs alkali metal chlorate. The chemical feeds are split between the pfr and the SVP®. Generally from about 50% to about 80% by weight of the alkali metal chlorate, from about 80% up to 100% by weight of the sulfuric acid and from about 30% to about 80% by weight of the hydrogen peroxide is fed to the pfr, with the remainder of the chemicals fed directly to the SVP® generator. Desirably, the fraction of alkali metal chlorate fed to the pfr is between about 60% and 70% and preferably is about 65% by weight. Desirably at least about 90% by weight of the total sulfuric acid is fed to the pfr. Hydrogen peroxide is fed to the pfr in an amount desirably between about 40% and about 70% by weight with about 50% by weight of the total peroxide being preferred. The purpose of using split feed is to maximize the acid concentration in the pfr which in turn maximizes chlorate conversion to chlorine dioxide.

In this embodiment, the spent liquor exiting the pfr and pumped to the SVP® generator is still rich in reaction chemicals. In the SVP® generator the chlorate conversion to chlorine dioxide is at least about 25% and can approach 100%.

In a second preferred embodiment, a mixture of chloric acid and alkali metal chlorate is fed to the pfr. The reaction is divided such that chloric acid reacts in the pfr and the liquor exiting the pfr, containing the unreacted alkali metal chlorate, is fed to an SVP® generator. In this embodiment, no sulfuric acid is fed to the pfr, thus preventing reaction of the alkali metal chlorate in the pfr. The entire amount of sulfuric acid is instead fed to the SVP® generator for reaction of the alkali metal chlorate in this later stage. Between about 80% and 100% by weight of the hydrogen peroxide is fed to the pfr, and desirably at least 90% by weight.

This embodiment is especially advantageous for using the output from an electrolytic cell for producing chloric acid, which is operated for partial conversion of alkali metal chlorate to chloric acid, leaving a considerable amount of unreacted alkali metal chlorate in the output stream. Generally the feed stream of chloric acid/alkali metal chlorate has a concentration of chloric acid from about 0.5 to about 6M, preferably from about 2.0 to about 3.0M, while the amount of alkali metal chlorate in the feed is from about 2.0 to about 5.0M, and preferably from about 3.0 to about 4.0M. It is advantageous from a process standpoint to maximize the amount of chloric acid in the feed stream, but the upper limit of chloric acid concentration is determined by the economics of the electrolytic cell process. Alternatively, instead of using an SVP® generator to react the alkali metal chlorate "dead load" in the exit stream from the pfr, the exit stream can be recycled to the electrolytic cell for further conversion to chloric acid.

Figure 2:
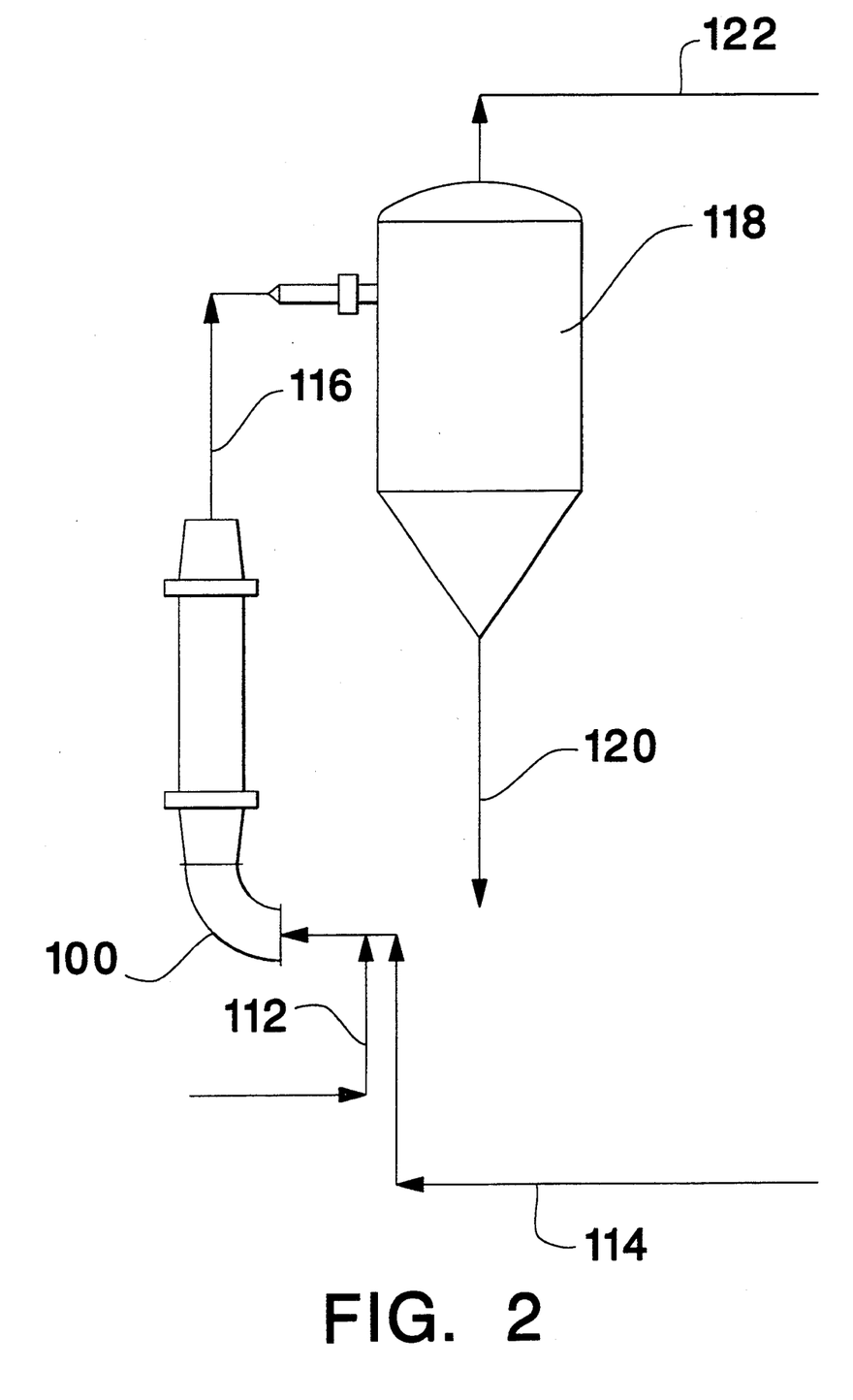
FIG. 2 is a schematic illustration of one embodiment of the process of the invention wherein a plug flow reactor is connected in series to a single vessel process generator.

FIG. 2 schematically illustrates a pfr reactor connected in series to an SVP ® generator. This arrangement could be used for the first and second embodiments described above.

As shown in FIG. 2, chemical feeds (chlorate and/or chloric acid, reducing agent and optionally sulfuric acid) are split between the pfr reactor and the SVP ® to optimize reaction performance, as described above. A plug flow reactor 100, contains one or a plurality of reaction tubes (not shown). The chemical feed enters the pfr via conduits 112 and 114. Unreacted chemicals and chlorine dioxide exit via conduit 116 and are fed to an SVP ® generator 118 where further reaction to approximately 100% conversion can occur. Sodium sulfate salt is crystallized in the SVP ® generator 118. The solid sodium sulfate is thereafter removed via conduit 120.

In a third preferred embodiment, the feed to the pfr is pure or substantially pure chloric acid. In this embodiment, due to the high reactivity of chloric acid with hydrogen peroxide and the lack of a saltcake by-product, the pfr can function as a stand alone chlorine dioxide generator. Chloric acid concentration is at least about 0.5M and can be as high as about 6M. The limiting factor for chloric acid concentration is stability. Above about 6M, the chloric acid solution tends to decompose. Desirably the chloric acid concentration is at least about 2.0M and preferably at least about 3.0M.

In general, the plug flow reactor of the invention can be either a single conduit or a plurality of conduits through which the process stream flows in parallel.

While the invention is not to be limited thereto, kinetic studies have revealed that the rate expression for a chlorine dioxide process using hydrogen peroxide, sulfuric acid and alkali metal chlorate is:

$$r_{ClO_2} = k[H_2SO_4]^{4.07}[H_2O_2]^{0.71}[NaClO_3]^{1.14}$$

where $$k = 2.81 \times 10^{12} \exp\left(\frac{-23659}{1.987 \times T}\right)$$

The rate expression for processes using either chloric acid alone or a mixture of chloric acid and "dead load" alkali metal chlorate is:

$$r_{ClO_2} = k[H^+]^{3.52}[ClO_3^-]^{6.97}[H_2O_2]^{1.04}$$

where $$k = 1.932 \times 10^{16} \exp\left(\frac{-35736}{RT}\right)$$

Thus the reaction is essentially 6th order for alkali metal chlorate processes and 11.5 for chloric acid processes.

The invention is illustrated by the following examples:

EXAMPLE 1

A 40 TPD SVP ® operated with methanol, sulfuric acid and sodium chlorate is converted to a 55 TPD process by connecting a 15 TPD plug flow reactor in series to the SVP ® generator. Hydrogen peroxide is used as the reducing agent for chlorate in a sulfuric acid medium in both the pfr and the SVP ®. To minimize the pfr size, the reactant profiles in the reactor are optimized. This is achieved by splitting the total chemical feeds to the system between the pfr and the SVP ® generator. For this example 70% by weight of the total chlorate feed and 100% by weight of the total acid feed are combined and directed into the pfr. Fifty percent of the total peroxide feed is also directed into the pfr. The pfr reactant feeds thoroughly mix in the short distribution header of the reactor. The mixed reactants then flow through the individual reaction tubes of the reactor. The calculated production rate in the pfr is as follows:

$$ClO_2 \frac{\text{Tons}}{\text{day}} = (40\% \text{ Conversion})(70\% \text{ of } ClO_3 \text{ feed})(86.9 \text{ tons } ClO_3)\left(\frac{67.4 \text{ lbs } ClO_2}{106.4 \text{ lbs } ClO_3}\right) \approx 15.0 \frac{\text{tons } ClO_2}{\text{day}}$$

Figure 3:
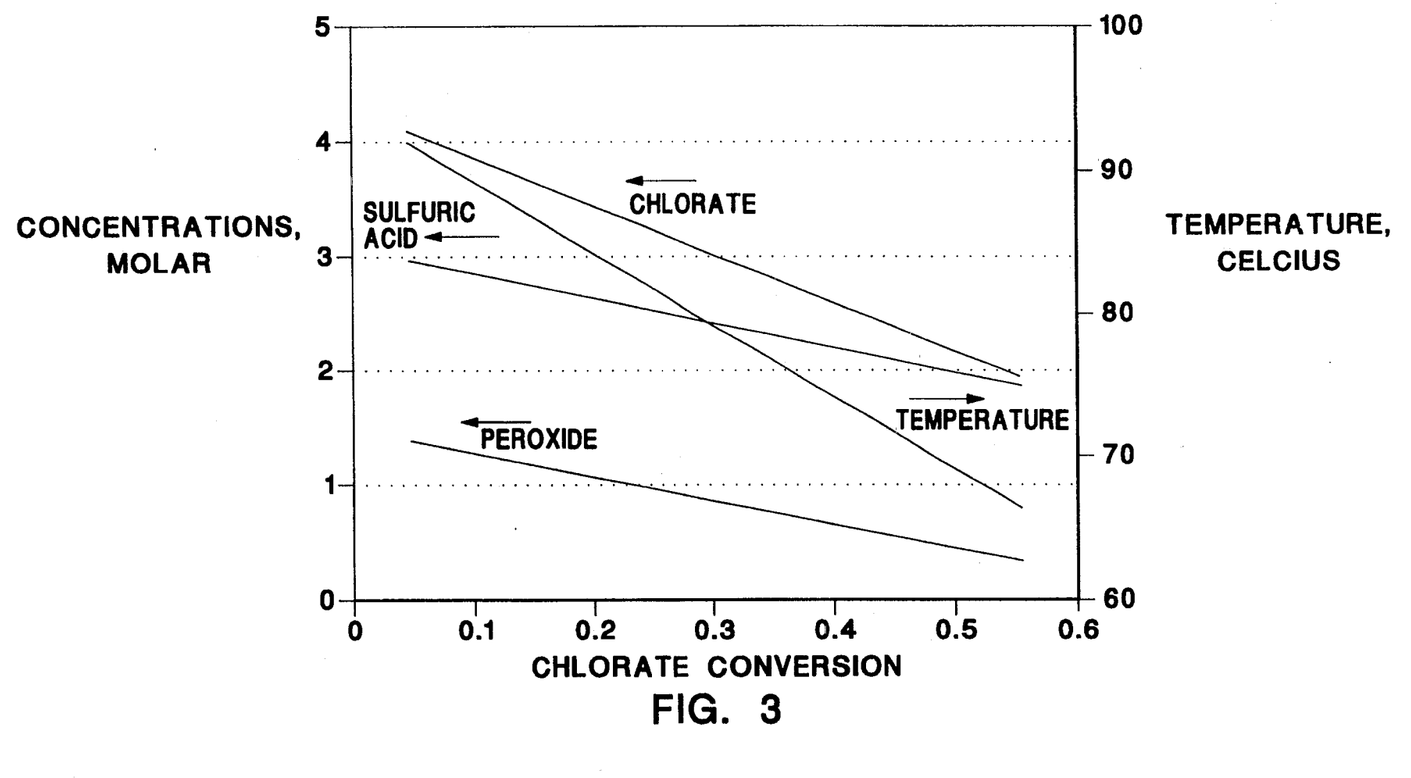
FIG. 3 is a graph of chlorate conversion vs. reactant concentration and temperature for operation of the plug flow reactor under adiabatic conditions.

To achieve these conversions, the residence time in each tube is approximately 15 minutes. The expected reactant concentrations and temperature profiles for this reactor are shown in FIG. 3.

EXAMPLE 2

A 40 TPD SVP ® using alkali metal chlorate, sulfuric acid and methanol as the reducing agent, operated in the substantial absence of added chloride ion, i.e., without salt addition, is converted to a 60 TPD process by connecting a 20 TPD plug flow reactor in series to the SVP ® generator. The feed to the pfr is a mixture of alkali metal chlorate and chloric acid which constitutes the output from an electrolytic cell. Hydrogen peroxide is used as the reducing agent both for chloric acid in the pfr, and for alkali metal chlorate in the SVP ®. Sulfuric acid is fed only to the SVP ® generator. In this example, 100% of an alkali metal chlorate—chloric acid feed are combined and directed into the pfr. The concentration of these species in the feed is 3.5M chlorate and 2.5M chloric acid. One hundred percent of the total peroxide feed is directed into the pfr through the center distributor conduit. The pfr reactant feeds thoroughly mix in the short distribution header of the reactor. The mixed reactants then flow through the individual reaction tubes of the reactor. Each reaction tube in the pfr is 1.5 inches in internal diameter and 1.5 ft long. The total number of tubes in the pfr is 8. Chlorate conversion is 35% of the incoming chlorate feed. The calculated production rate in the pfr reaction is shown below.

$$ClO_2 \frac{\text{Tons}}{\text{day}} = (35\% \text{ Conversion})(100\% \text{ of } ClO_3 \text{ feed})(94.8 \text{ tons } ClO_3)\left(\frac{67.4 \text{ lbs } ClO_2}{106.4 \text{ lbs } ClO_3}\right) \approx 20.0 \frac{\text{tons } ClO_2}{\text{day}}$$

Figure 4:
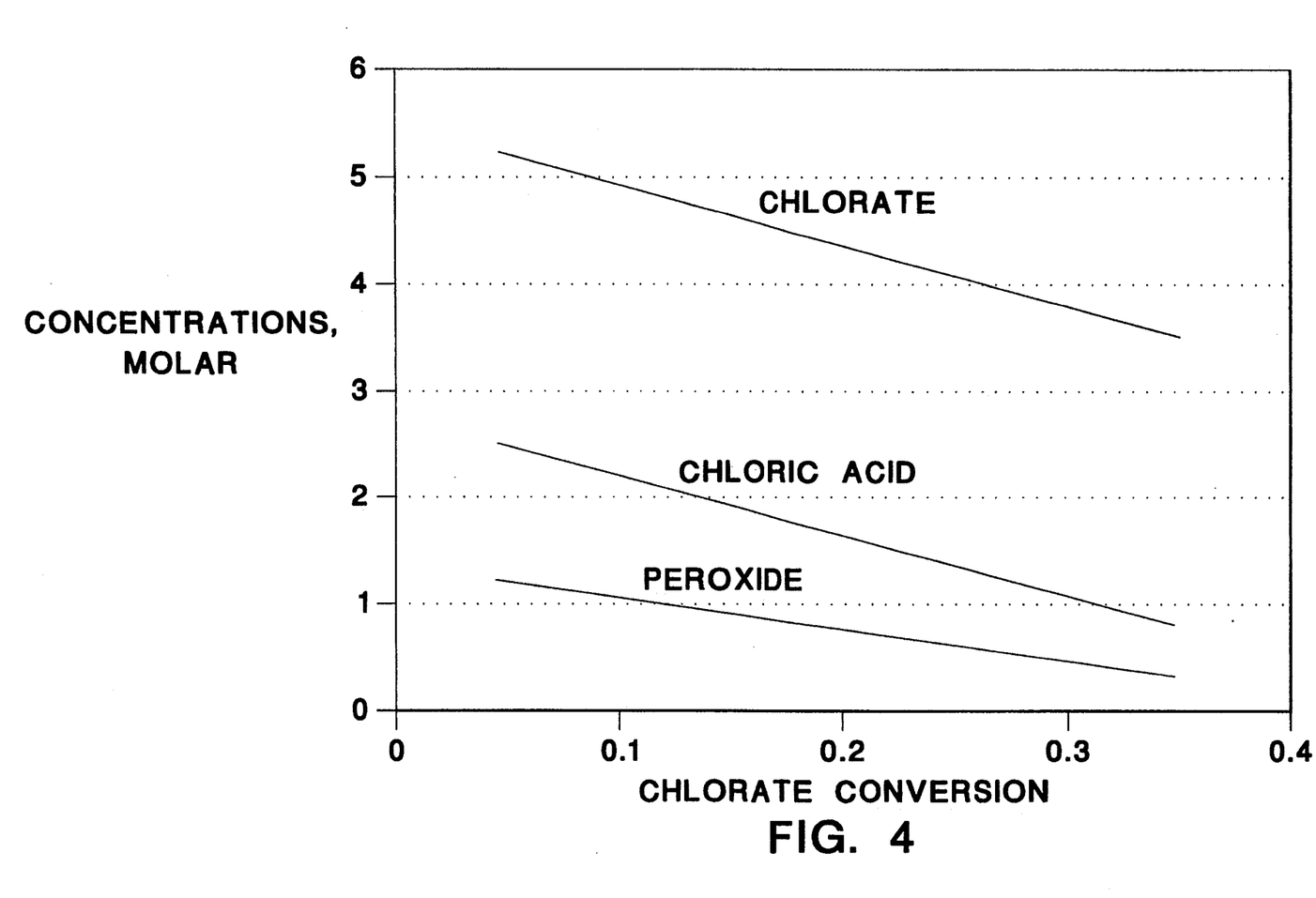
FIG. 4 is a graph of chlorate conversion vs. reactant concentration for operation of the plug flow reactor under isothermal conditions.

To achieve these conversions, the residence time in each tube is 10 minutes. Each tube is open-ended at the top of the reactor to allow for gas—liquid separation and liquid overflow. Product chlorine dioxide gas flows out of the top reactor head, and spent reaction liquor flows out of the tubes and collects in the bottom of the reactor shell. This liquor is rich in chlorate and peroxide and is pumped out of the shell, and into the SVP® generator. In this vessel the alkali metal chlorate is converted to chlorine dioxide (approximately 100% conversion). The pfr is operated isothermally, with the energy needed to drive the reaction in the pfr provided by steam. The pfr is operated in a non-crystallization mode at a pressure of 300 mm Hg. Air is added to the pfr to dilute the chlorine dioxide product gas. The expected reactant concentrations and temperature profiles for this reactor are shown in FIG. 4.

EXAMPLE 3

From an electrolytic cell, partially converted chlorate solution containing chloric acid is fed to a pfr as described above and reacted with hydrogen peroxide. Since no other acids or detrimental by-products are present, only the chloric acid reacts to form chlorine dioxide. Unreacted sodium chlorate is then combined with fresh alkali metal chlorate, recycled to the electrochemical cell, and further converted to chloric acid. This process is optimized to give good current efficiency and chemical stability by keeping the per pass conversion of chlorate low in the cell (i.e., 25% conversion of the total chlorate feed to the cell) and the per pass conversion of the chloric acid in the pfr high (i.e., 50% conversion of the total chloric acid feed to the pfr).

EXAMPLE 4

A 40 TPD SVP® using alkali metal chlorate, sulfuric acid and methanol as the reducing agent, operated in the substantial absence of added chloride ion, i.e., without salt addition, is replaced with a 40 TPD pfr—chloric acid cell system. For this example, 100% of the total chlorate—chloric acid feed is directed into the pfr. One hundred percent of the total peroxide feed is also directed into the pfr through the center distribution conduit. The pfr reactant feeds thoroughly mix in the short distribution header of the reactor. The mixed reactants then flow through the individual reaction tubes of the reactor. Flow through the tubes is in the laminar flow region. Each tube functions as an individual pfr, and has an internal diameter of 2 inches and a length of 2.5 ft. Chlorate conversion is 35% of the incoming chlorate feed. The calculated production rate in the pfr is shown below.

300 mm Hg. Air is added to the reactor to dilute the chlorine dioxide product gas.

Although the present invention has been described in connection with preferred embodiments of the invention, it will be appreciated by those skilled in the art that additions, substitutions, modifications and deletions not specifically described, may be made without departing from the spirit and scope of the invention as defined in the appended claims.

What is claimed is:

1. A process for producing chlorine dioxide, comprising the steps of:
   (a) continuously feeding alkali metal chlorate, sulfuric acid and hydrogen peroxide as a reducing agent to a plug flow reactor comprising a conduit through which fluid flows in an orderly manner with no element of fluid overtaking or mixing with any other element ahead or behind, and forming thereby a plug flow process stream flowing through the reactor;
   (b) forming chlorine dioxide and by-product alkali metal salt in said process stream by reduction of the alkali metal chlorate; and
   (c) recovering the chlorine dioxide and alkali metal salt exiting the plug flow reactor.

2. A process as claimed in claim 1, wherein the process stream has an acid normality of from about 2 to about 5, and wherein said alkali metal salt comprises alkali metal sulfate.

3. A process as claimed in claim 1, wherein the process stream has an acid normality of from above about 5 to about 12, and wherein said alkali metal salt comprises alkali metal sesquisulfate.

4. A process as claimed in claim 1, wherein up to about 50 mole % of the alkali metal chlorate fed to the plug flow reactor is reduced to chlorine dioxide and wherein said process further includes the steps of:
   (d) separating the formed chlorine dioxide from the process stream exiting the plug flow reactor, forming thereby a gas stream containing the chlorine dioxide and an aqueous liquor containing unreacted alkali metal chlorate and by-product alkali metal salt;
   (e) feeding the aqueous liquor to a chlorine dioxide generator for conversion of at least a portion of said unreacted alkali metal chlorate to chlorine dioxide.

5. A process as claimed in claim 4, wherein said chlorine dioxide generator comprises a single reaction vessel containing a reaction medium, said reaction medium $$ClO_2 \frac{Tons}{day} = (35\% \text{ Conversion})(100\% \text{ of } ClO_3 \text{ feed})(180 \text{ tons } ClO_3) \left( \frac{67.4 \text{ lbs } ClO_2}{106.4 \text{ lbs } ClO_3} \right) \approx 40.0 \frac{\text{tons } ClO_2}{\text{day}}$$

To achieve these conversions, residence times in each tube are 10 minutes. The chloric acid portion of the feed is driven to almost complete conversion. Product chlorine dioxide gas flows out of the top reactor head, and is collected. Spent reaction liquor flows out of the tubes and collects in the bottom of the reactor shell. This liquor is still rich in chlorate but low in acidity and peroxide. It is then pumped out of the shell, and back to an electrochemical cell. The pfr is operated isothermally. The energy needed to drive the reaction in the pfr is provided by a suitable heating medium (i.e., steam or hot water). The pfr is operated at a pressure of about including said aqueous liquor.

6. A process as claimed in claim 5, wherein solid alkali metal salt is continuously deposited and removed from said reaction medium.

7. A process as claimed in claim 4, wherein the process has an overall conversion rate of alkali metal chlorate to chlorine dioxide of between about 25 and about 100%.

8. A process as claimed in claim 4, wherein the process has an overall conversion rate of alkali metal chlorate to chlorine dioxide of about 100%.

9. A process for producing chlorine dioxide, comprising the steps of:
   (a) continuously feeding chloric acid and hydrogen peroxide as a reducing agent to a plug flow reactor comprising a conduit through which fluid flows in an orderly manner with no element of fluid overtaking or mixing with any other element ahead or behind, and forming thereby a plug flow process stream flowing through the reactor;
   (b) forming chlorine dioxide in said process stream by reduction of the chloric acid; and
   (c) recovering the chlorine dioxide exiting the plug flow reactor.

10. A process as claimed in claim 9, wherein the chloric acid concentration in the process stream entering the plug flow reactor is from about 3M to about 6M.

11. A process as claimed in claim 9, wherein the process stream of step (a) further includes alkali metal chlorate which remains unreacted in the plug flow reactor.

12. A process as claimed in claim 11, wherein said process further includes the step of feeding sulfuric acid and the process stream exiting the plug flow reactor to a single reaction vessel for conversion of at least a portion of said unreacted alkali metal chlorate to chlorine dioxide.

13. A process as claimed in claim 11, wherein the process stream of step (a) comprises an output from an electrolytic cell, and wherein said process further includes the step of recycling the process stream exiting the plug flow reactor to the electrolytic cell.

14. A method for increasing the production capacity of an existing chlorine dioxide plant by converting the plant to a multistage process using hydrogen peroxide as a reducing agent and a plug flow reactor as a first stage, said existing plant including a single vessel process which provides for the production of chlorine dioxide by reducing alkali metal chlorate with methanol as a reducing agent in an aqueous reaction medium containing sulfuric acid, said reaction medium maintained in a single vessel process generator under subatmospheric pressure, the single vessel process including the steps of maintaining said reaction medium at boiling point at a temperature of from about 50° C. to about 100° C. to evaporate water from said reaction medium and to provide a gaseous mixture containing steam and chlorine dioxide;

said method for increasing production capacity including the steps of:
   (a) continuously feeding alkali metal chlorate, sulfuric acid and hydrogen peroxide as a reducing agent to a plug flow reactor comprising a conduit through which fluid flows in an orderly manner with no element of fluid overtaking or mixing with any other element ahead or behind, and forming thereby a plug flow process stream flowing through the reaction;
   (b) forming chlorine dioxide and by-product alkali metal salt in said process stream by partial reduction of the alkali metal chlorate; and
   (c) feeding the process stream exiting the plug flow reactor to the single vessel process generator, thereby forming therein an aqueous reaction medium containing hydrogen peroxide as a reducing agent, and converting at least a portion of said unreacted alkali metal chlorate to chlorine dioxide.

15. The method of claim 14, wherein the conversion rate of alkali metal chlorate in the single reaction vessel is about 100%.

16. A method for increasing the production capacity of an existing chlorine dioxide plant by converting the plant to a multistage process using hydrogen peroxide as a reducing agent and a plug flow reactor as a first stage, said existing plant including a single vessel process which provides for the production of chlorine dioxide by reducing alkali metal chlorate with methanol as a reducing agent in an aqueous reaction medium containing sulfuric acid, said reaction medium maintained in a single vessel process generator under subatmospheric pressure, the single vessel process including the steps of maintaining said reaction medium at boiling point at a temperature of from about 50° C. to about 100° C. to evaporate water from said reaction medium and to provide a gaseous mixture containing steam and chlorine dioxide;

said method for increasing production capacity including the steps of:
   (a) continuously feeding a mixture of alkali metal chlorate, chloric acid, and hydrogen peroxide as a reducing agent to a plug flow reactor comprising a conduit through which fluid flows in an orderly manner with no element of fluid overtaking or mixing with any other element ahead or behind, and forming thereby a plus flow process stream flowing through the reactor;
   (b) forming chlorine dioxide in said process stream by reduction of the chloric acid; and
   (c) feeding sulfuric acid and the process stream exiting the plug flow reactor to the single vessel process generator, thereby forming therein an aqueous reaction medium containing hydrogen peroxide as a reducing agent, and converting at least a portion of said unreacted alkali metal chlorate to chlorine dioxide.

17. The method of claim 16, wherein the conversion rate of alkali metal chlorate in the single reaction vessel is about 100%.

* * * * *